US011919560B2

(12) United States Patent
Yi

(10) Patent No.: US 11,919,560 B2
(45) Date of Patent: *Mar. 5, 2024

(54) SEAT HEIGHT ADJUSTMENT MECHANISM AND STROLLER HAVING THE SAME

(71) Applicant: WONDERLAND SWITZERLAND AG, Steinhausen (CH)

(72) Inventor: Xiaolong Yi, Guangdong (CN)

(73) Assignee: WONDERLAND SWITZERLAND AG, Steinnausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,722

(22) Filed: Dec. 1, 2022

(65) Prior Publication Data

US 2023/0095860 A1    Mar. 30, 2023

Related U.S. Application Data

(63) Continuation of application No. 17/358,022, filed on Jun. 25, 2021, now Pat. No. 11,541,924.

(30) Foreign Application Priority Data

Jun. 28, 2020   (CN) .......................... 202010598976.9

(51) Int. Cl.
*B62B 9/10* (2006.01)
*B62B 7/04* (2006.01)

(52) U.S. Cl.
CPC ............... *B62B 9/104* (2013.01); *B62B 7/04* (2013.01)

(58) Field of Classification Search
CPC   B62B 9/104; B62B 9/102; B62B 9/12; B62B 7/04; B62B 7/06; B62B 7/14; B62B 7/142; B62B 7/145
See application file for complete search history.

(56) References Cited

U.S. PATENT DOCUMENTS

| | | | |
|---|---|---|---|
| 7,753,448 B2* | 7/2010 | Chen ...................... | A47D 1/023 297/16.1 |
| 7,789,402 B2* | 9/2010 | Saville .................... | B62B 7/145 280/47.38 |
| 10,449,987 B2* | 10/2019 | Gibson ..................... | B62B 9/28 |
| 2013/0087993 A1* | 4/2013 | Jacquet .................... | B62B 7/12 280/647 |
| 2013/0277949 A1* | 10/2013 | Yin ......................... | B62B 7/064 280/658 |

* cited by examiner

*Primary Examiner* — John D Walters

(57) ABSTRACT

A seat height adjustment mechanism includes a locking bar and a locking element. The locking bar is disposed in a stroller frame and has locking holes spaced apart. Each of the locking holes has a stop portion protruding therein. The locking element is mounted on a seat and has an engaging end. The engaging end is separably engaged in any one of the locking holes and has an engaging hook protruding in a direction, and the direction is crossed with another direction in which the engaging end moves when the engaging end is separating from the locking hole. The engaging hook separably presses against the stop portion. Therefore, the engaging end cannot separate from the locking hole. Even when wrongly operated, the locking element cannot be rotated and unlocked and thereby prevents the seat from unnecessarily sliding downward, so as to ensure safety of a baby at the seat.

21 Claims, 8 Drawing Sheets

SEAT HEIGHT ADJUSTMENT MECHANISM AND STROLLER HAVING THE SAME

CROSS-REFERENCE TO RELATED APPLICATION

This application is a continuation application of U.S. application Ser. No. 17/358,022 filed on Jun. 25, 2021, the entire contents of which are hereby incorporated by reference for which priority is claimed under 35 U.S.C. § 120.

BACKGROUND OF THE INVENTION

1. Field of the Invention

The present disclosure relates to baby carriages, and in particular to a seat height adjustment mechanism capable of preventing the seat from sliding downward as a result of misuse and a stroller with the seat height adjustment mechanism.

2. Description of the Related Art

Baby carriages, for example, strollers and safety seats, are widely used by families with babies. In this regard, strollers are convenient for babies' outdoor activities. The stroller reduces the burden of carrying babies by hand, and provides comfort and safety to the babies.

A conventional stroller comprises a seat, a stroller frame, and wheels disposed on the stroller frame. In general, the seat and the stroller frame are collapsible. The angle of the seat can be adjusted in order to ensure that the comfort of the babies. Furthermore, the height of the seat can be adjusted in order to allow adults of different heights to operate the stroller easily. A locking mechanism is used after adjusting the angle and/or height of the seat, to ensure the seat's stability and safety. However, conventional locking mechanisms are not designed to prevent misuse. When users mistakenly touch the locking mechanism and the locking mechanism is released, the seats are likely to slide downward along the stroller frame with their own weight, thereby causing danger.

Therefore, it is necessary to provide a seat height adjustment mechanism capable of preventing misuse and a stroller with the seat height adjustment mechanism.

BRIEF SUMMARY OF THE INVENTION

An objective of the present disclosure is to provide a seat height adjustment mechanism capable of preventing misuse. Another objective of the present disclosure is to provide a stroller capable of preventing a seat height adjustment mechanism from being wrongly operated.

To achieve at least the above objective, the present disclosure provides a seat height adjustment mechanism for adjusting a height of a seat on a stroller frame, comprising a locking bar and a locking element. The locking bar is disposed in the stroller frame and has locking holes spaced apart, each of the locking holes having a stop portion protruding therein. The locking element is mounted on the seat and has an engaging end. The engaging end is separably engaged in any one of the locking holes. The engaging end has an engaging hook protruding in a direction, and the direction is crossed with another direction in which the engaging end moves when the engaging end is separating from the locking hole. The engaging hook separably presses against the stop portion.

Preferably, the engaging end has a first position and a second position in a height adjustment direction of the seat, the engaging end automatically moves to the first position to cause the engaging hook to press against the stop portion when the engaging end is engaged in the locking hole, and the engaging hook separates from the stop portion when the engaging end is moved to the second position, causing the engaging end to move and separate from the locking hole.

Preferably, a direction of switching from the first position to the second position is the direction of moving the seat from a low level to a high level.

Preferably, an engaging slot is formed between the stop portion and an inner wall of the locking hole, and the engaging hook is separably engaged in the engaging slot.

Preferably, the engaging end further has a driving slope, and the driving slope drives the engaging end to separate from the locking hole when under a force.

Preferably, the seat height adjustment mechanism further comprises: a releasing element pivotally connected to the seat, pressed against the locking element, and driving the locking element to move and separate from the locking hole upon a separation of the engaging hook and the stop portion; and a resilient element mounted on the seat and pressed against the locking element Preferably, the seat height adjustment mechanism further comprises a connection unit mounted on the seat and slidingly connected to the stroller frame, wherein the locking element and the releasing element are pivotally connected to the connection unit to drive the connection unit to slide along the stroller frame and allow the locking element to be separably engaged in any one of the locking holes, thereby adjusting a height of the seat.

Preferably, the locking element further comprises a pressing end. An included angle is defined between the pressing end and the direction which the engaging end is protruding. The pressing end presses against the releasing element, such that the engaging end moves and separates from the locking hole.

Preferably, the locking element further comprises a pivotal portion pivotally connected to the connection unit. The engaging end and the pressing end connect to the pivotal portion and respectively protrude in two directions.

Preferably, the resilient element is mounted on the connection unit and comprises a first resilient arm and a second resilient arm. The first resilient arm connects to the engaging end. The second resilient arm presses against the connection unit.

Preferably, the releasing element has an end pivotally connected to the connection unit and pressing against the pressing end, and the releasing element has another end protruding from the connection unit to form an operating end.

Accordingly, the present disclosure further provides a stroller comprising a stroller frame, a seat adjustably mounted on the stroller frame, and the seat height adjustment mechanism.

Preferably, after the locking element has been engaged in the locking hole, the locking element spontaneously presses against the stop portion, wherein when the seat moves toward a top of the stroller frame, the engaging hook is driven and separated from the stop portion and the locking element is also driven and separated from the locking hole.

Preferably, the engaging end further has a driving slope. When applying a force, the seat moves toward a top of the stroller frame, such that the driving slope is subjected to the force to thereby drives the locking element to separate from the locking hole.

Preferably, the stroller frame comprises a rail which the locking bar is disposed in, and the seat height adjustment mechanism further comprises a connection unit slidingly connected to the rail and connected to the seat, and the locking element is pivotally connected to the connection unit, wherein when applying a force, the seat slides to thereby drive the connection unit sliding along the rail and cause the locking element to be separably engaged in any one of the locking holes.

Preferably, the stroller further comprises a sliding element slidingly connected to the rail and connected to the connection unit and the seat.

Compared with the prior art, the seat height adjustment mechanism of the present disclosure comprises a stop portion and a locking element which are disposed protrudingly in each locking hole and an engaging end separably engaged in any one of the locking holes. The engaging end protrudingly forms an engaging hook. The protrusion direction of the engaging hook crosses the direction in which the engaging end moves and separates from the locking hole. The engaging hook separably presses against the stop portion. Therefore, after the engaging end has been engaged in the locking hole, the stop portion presses against the engaging hook to stop the engaging end from separating from the locking hole; hence, even if the locking element is wrongly operated, it cannot be rotated pivotally and unlocked, thereby preventing the seat from sliding downward along the stroller frame spontaneously as a result of wrong operation of the locking element, ensuring the safety and stability of connection of the seat, and further ensuring the safety of any baby sitting at the seat. Accordingly, a stroller with the seat height adjustment mechanism is further provided.

DETAILED DESCRIPTION OF THE INVENTION

Figure 1:
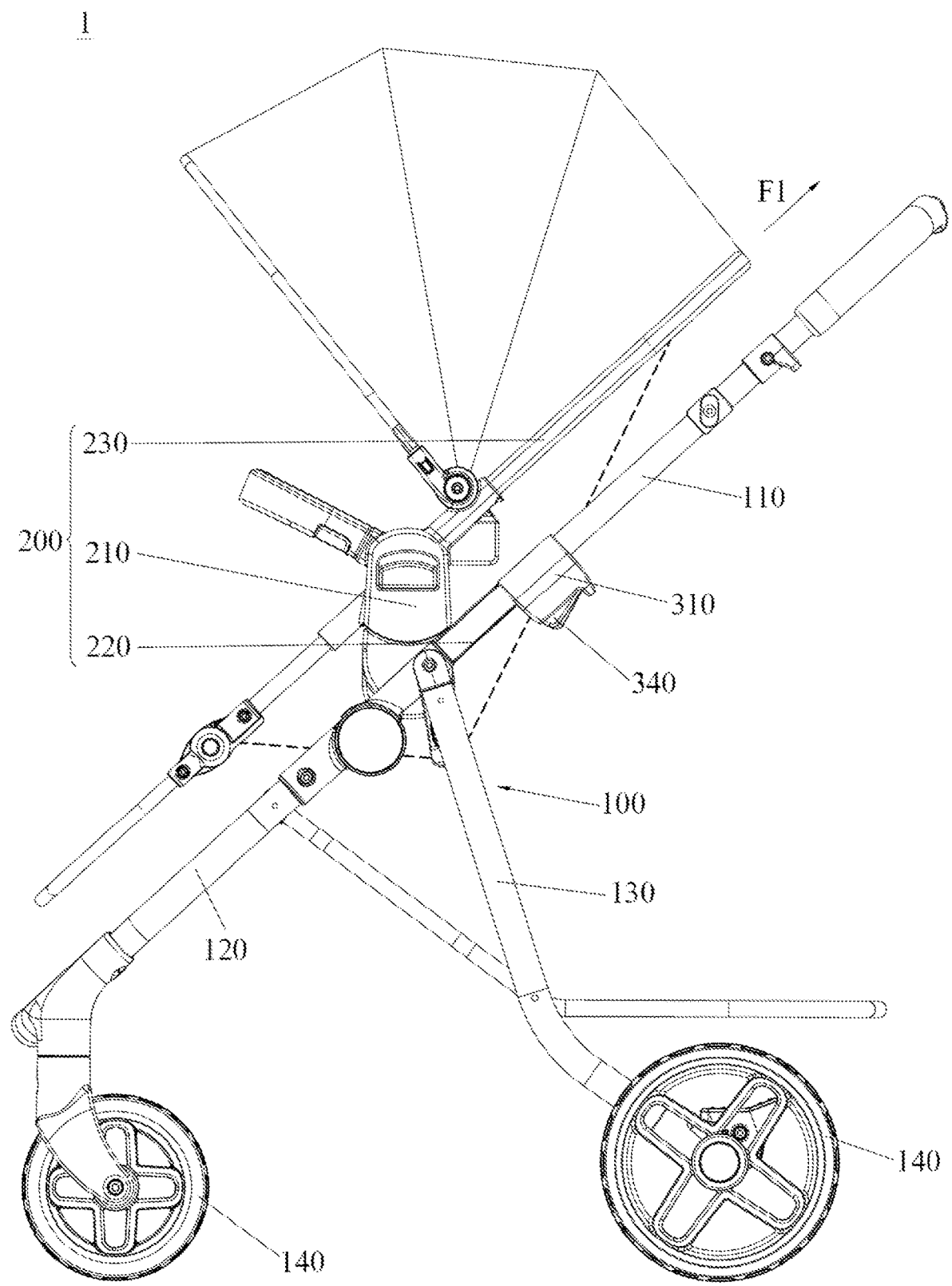
FIG. 1 is a lateral view of a stroller in operation according to the present disclosure.

To facilitate understanding of the object, characteristics and effects of this present disclosure, embodiments together with the attached drawings for the detailed description of the present disclosure are provided.

The present disclosure provides a seat height adjustment mechanism 300 capable of preventing a seat 200 from sliding downward after wrong operation and a stroller 1 having the seat height adjustment mechanism 300.

Referring to FIGS. 1-4, the stroller 1 of the present disclosure comprises a stroller frame 100, seat 200 and seat height adjustment mechanism 300. Owing to seat height adjustment mechanism 300, seat 200 is regulatably mounted on stroller frame 100. The stroller frame 100 comprises a rail 110, front leg 120, and rear leg 130. The front leg 120 and rear leg 130 are pivotally connected to the rail 110. Rollers 140 are mounted on the front leg 120 and rear leg 130. The stroller frame 100 is conventionally structured and connected and thus is not described in detail herein. The seat 200 is adjustably mounted on the rail 110, such that seat 200 can be pulled upward to directly move seat 200 to a high level (as described later). Moving seat 200 to a low level entails operating seat height adjustment mechanism 300 by hand to unlock it, thereby preventing seat 200 from automatically sliding downward when seat height adjustment mechanism 300 is wrongly operated.

Figure 2:
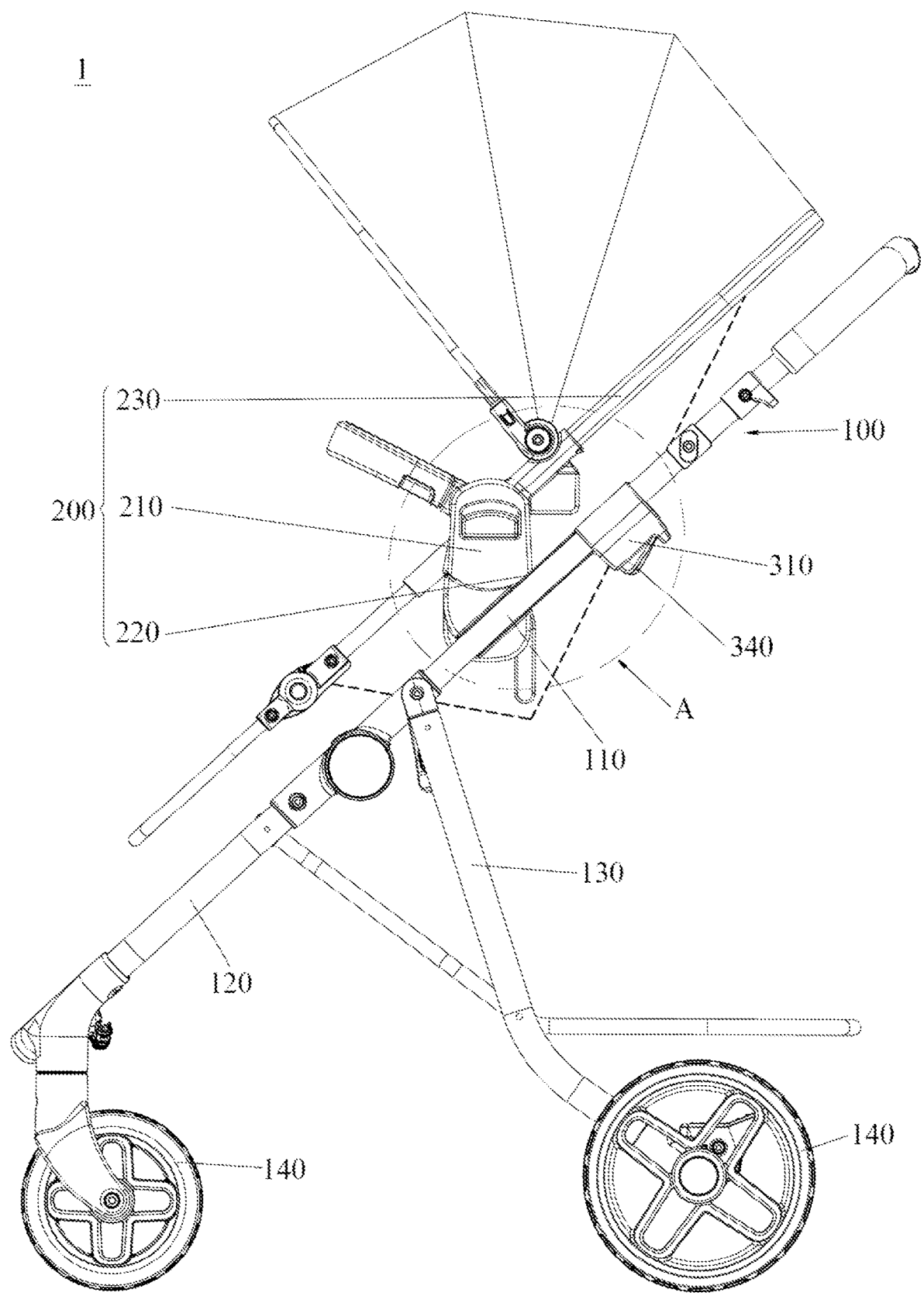
FIG. 2 is a schematic view of a seat adjusted according to FIG. 1.
Figure 3:
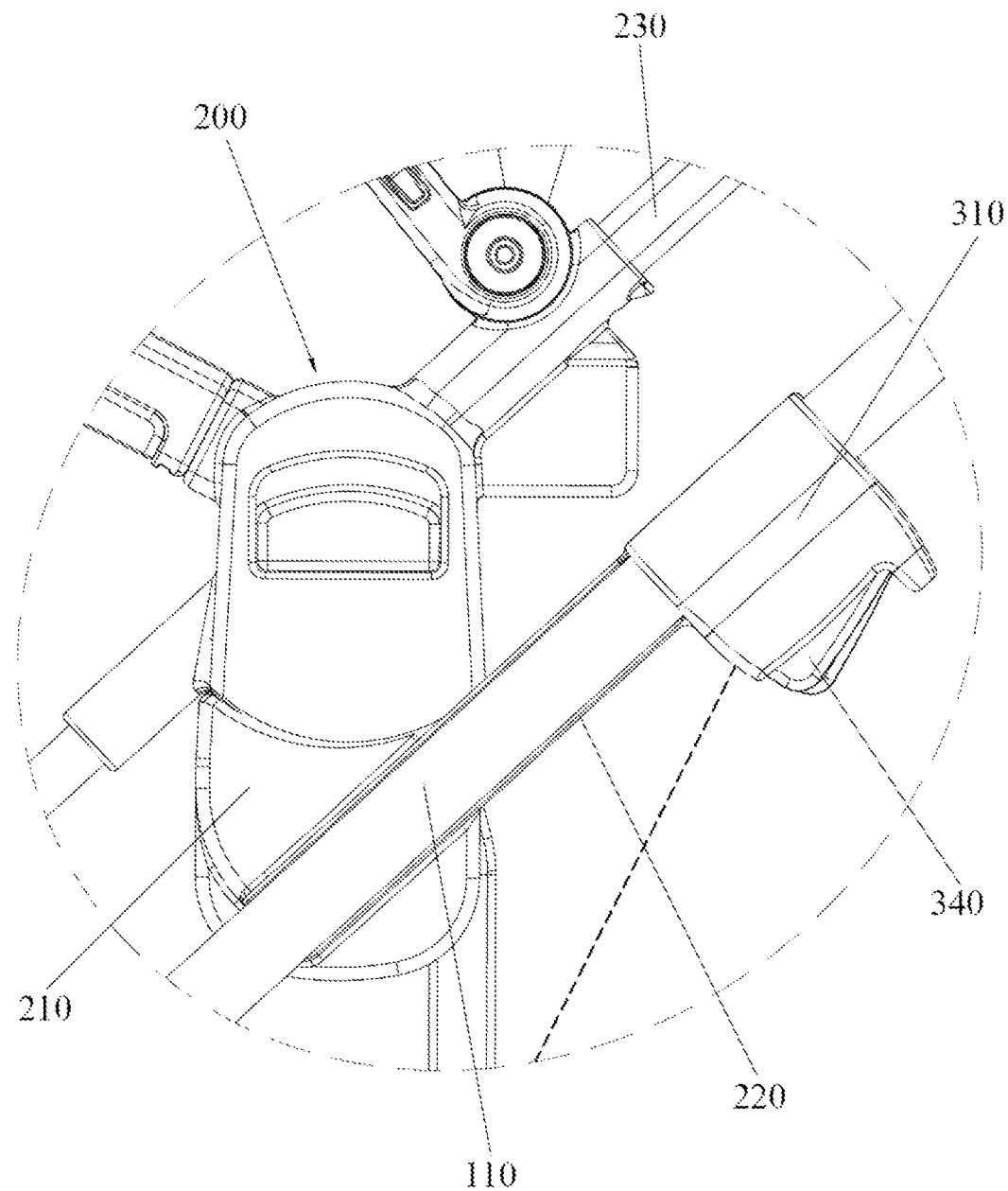
FIG. 3 is an enlarged view of part A in FIG. 2.

Referring to FIGS. 1-3, according to the present disclosure, the seat 200 has a mounting unit 210, a sliding element 220 connected to the mounting unit 210, and a backrest pipe 230. The seat 200 is slidingly connected to the rail 110 from outside through the sliding element 220. According to the present disclosure, the backrest pipe 230 is pulled upward to drive the sliding element 220 sliding upward along the rail 110, and thus seat 200 is moved to the high level, thereby rendering a more convenient adjustment. The adjustment in the present disclosure is not limited to pulling the backrest pipe 230, as the seat 200 also can be moved to the high level by pulling any parts of the seat 200. The other parts of the seat 200, such as a canopy pipe and a rail pipe, are conventionally structured and connected and thus are not described in detail herein.

Referring to FIGS. 3-7, the seat height adjustment mechanism 300 of the stroller 1 of the present disclosure comprises a connection unit 310, a locking bar 320, and a locking element 330. The locking bar 320 is disposed in the rail 110 and has locking holes 321 spaced apart. Each of the locking holes 321 has a stop portion 322 protruding therein. The connection unit 310 is slidingly connected to the rail 110 from outside of the rail 110, and connected to the sliding element 220. The sliding element 220 slides along the rail 110 to drive the connection unit 310 to slide. The locking element 330 is pivotally connected to the connection unit 310 and has an engaging end 331. The engaging end 331 protrudes from the connection unit 310 and is separably engaged in any one of the locking holes 321. The engaging end 331 has an engaging hook 3311. The engaging hook 3311 protrudes in a direction, and the direction is crossed with another direction in which the engaging end 331 moves when the engaging end 331 is separating from the locking hole 321. The engaging hook 3311 separably presses against the stop portion 322.

Figure 6:
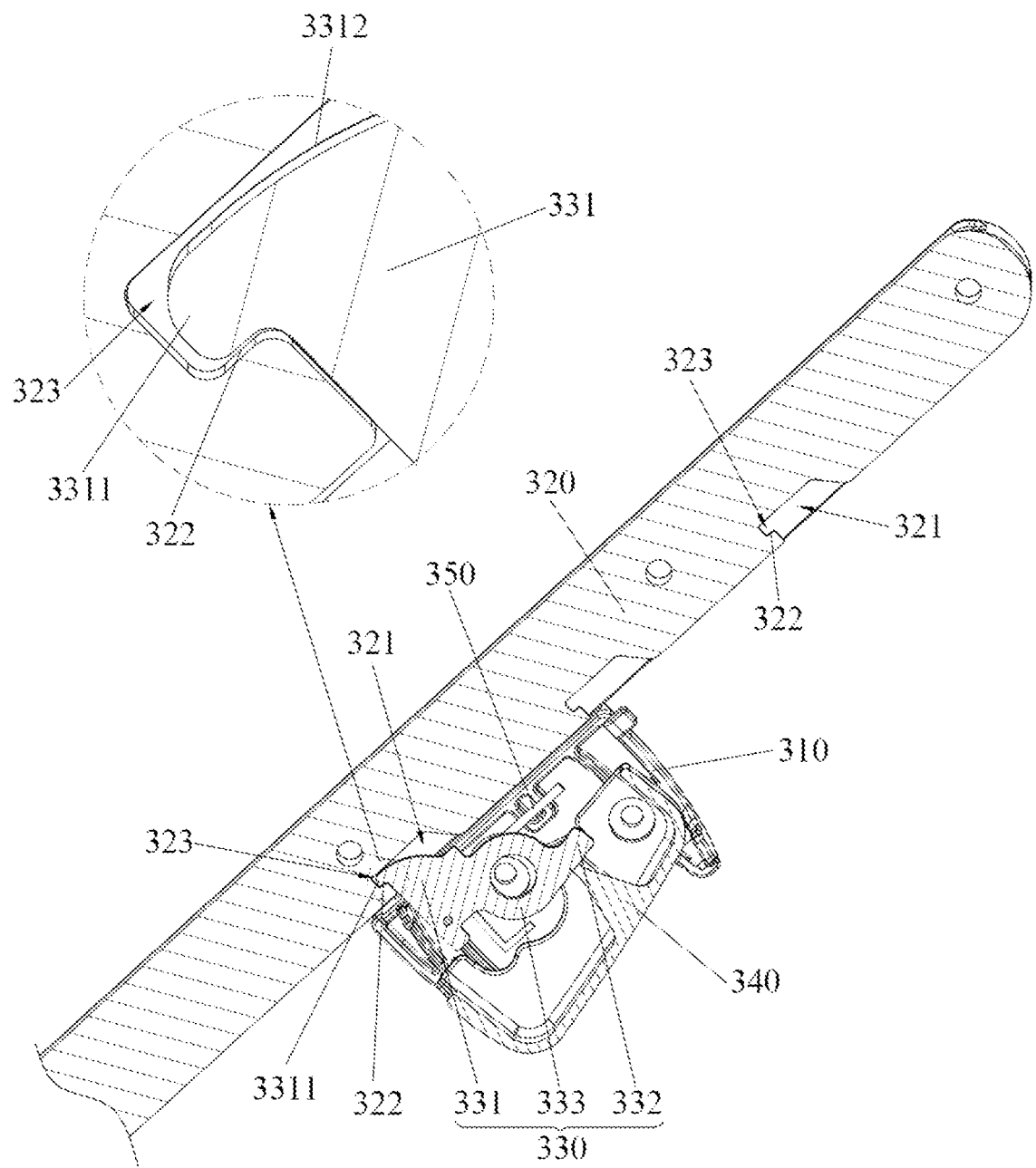
FIG. 6 is a cross-sectional view of the seat height adjustment mechanism of the present disclosure.
Figure 7:
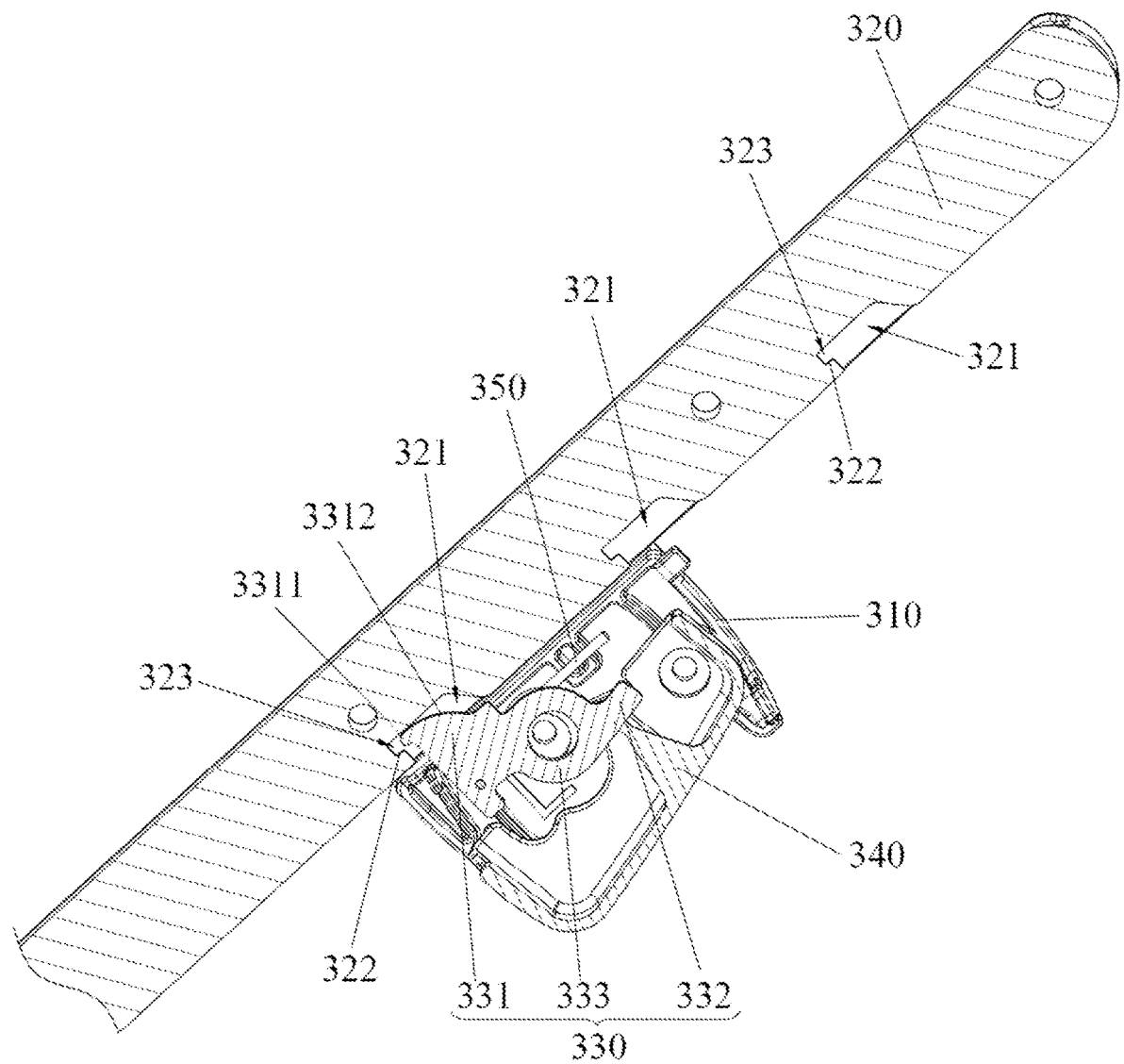
FIG. 7 is a schematic view of the locking element shown in FIG. 6 and located at a second position.
Figure 8:
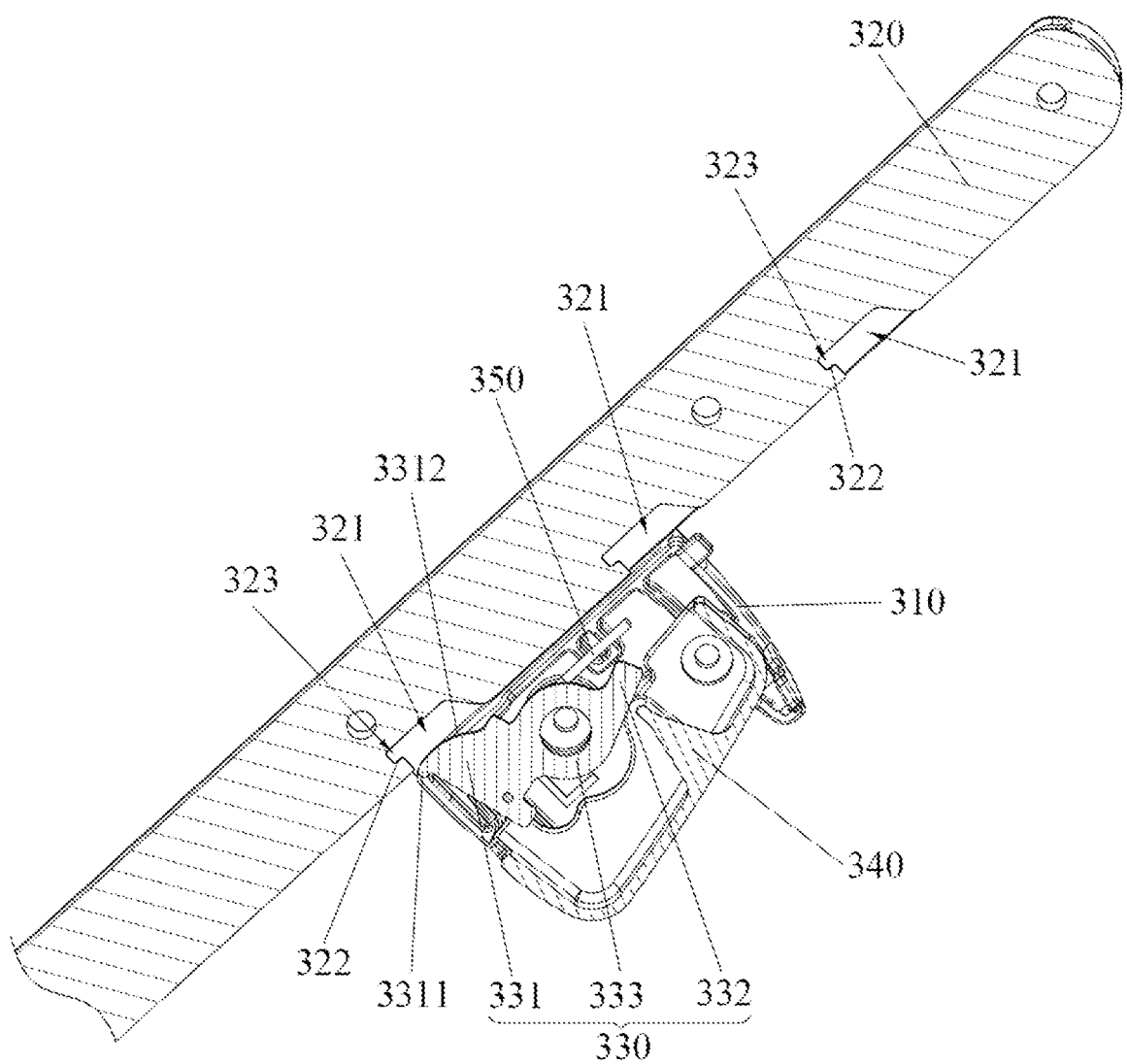
FIG. 8 is a schematic view of the locking element shown in FIG. 7 and separated from a locking hole.

Referring to FIGS. 1-2 and FIGS. 6-8, according to the present disclosure, engaging end 331 has a first position and a second position in the height adjustment direction of seat 200. The height adjustment of the seat 200 drives the connection unit 310 to slide along the rail 110 and causing the locking element 330 to be separably engaged in any one of the locking holes 321. When the engaging end 331 is engaged in the locking hole 321, the seat 200 slides downward along the rail 110 due to its' weight, to thereby drive a sliding of the locking element 330, such that the engaging end 331 automatically moves to the first position, thereby causing the engaging hook 3311 to press against the stop portion 322 when the engaging end 331 is engaged in the locking hole 321. The stop portion 322 stops the engaging end 331 from separating from the locking hole 321, as shown in FIG. 6. When the seat 200 is moved toward a top of the stroller frame, the engaging hook 3311 is driven and separated from the stop portion 322, thereby causing the engaging end 331 to move from the first position to the second position, as shown in FIG. 7. Then, the engaging end 331 moves and is also driven and separated from the locking hole 321 to release the locking element 330, as shown in FIG. 8, thereby allowing the seat 200 to undergo height adjustment. The direction of switching from the first position to the second position is the direction of moving the seat 200 from the low level to the high level, i.e., the direction indicated by arrow F1 of FIG. 1.

Referring to FIGS. 6-7, stop portion 322 is protrudingly disposed on the lower wall of locking hole 321, and the stop portion 322 protrudes in a direction of the upper wall of locking hole 321. Consequently, an engaging slot 323 is formed between stop portion 322 and the inner wall and the lower wall of locking hole 321. The engaging hook 3311 is separably engaged in the engaging slot 323. When the engaging hook 3311 is engaged in the engaging slot 323, the engaging hook 3311 presses against the stop portion 322; meanwhile, the locking element 330 cannot rotate, allowing the engaging end 331 to separate from the locking hole 321.

Referring to FIG. 4-8, the locking element 330 further comprises a pressing end 332 and a pivotal portion 333. The pivotal portion 333 has a pivotal hole, whereby the locking element 330 is pivotally connected to the connection unit 310 by the pivotal hole. The engaging end 331 and the pressing end 332 are connected to the pivotal portion 333, and protruding directions of the engaging end 331 and the pressing end 332 define an angle. The engaging end 331 protrudes from the connection unit 310 in order to be separably engaged with the locking hole 321. Under an applied force, the pressing end 332 drives the locking element 330 to pivot, thereby causing the engaging end 331 to separate from the locking hole 321.

The engaging end 331 further has a driving slope 3312. Preferably, the driving slope 3312 is an arcuate structure. The driving slope 3312 extends in the same direction with the protruding direction of the engaging hook 3311. Hence, the driving slope 3312 extends arcuately from a lateral surface of the engaging end 331 to the end portion of the engaging hook 3311. Under an applied force, the driving slope 3312 causes the locking element 330 to pivot, thereby allowing the engaging end 331 to separate from the locking hole 321. According to the present disclosure, when the seat 200 drives the connection unit 310 to slide upward along the rail 110, the rim of the locking hole 321 interacts with the driving slope 3312 to thereby drive the locking element 330 to pivot, thereby allowing the engaging end 331 to separate from the locking hole 321 when under a force.

Referring to FIGS. 4-8, the seat height adjustment mechanism 300 further comprises a releasing element 340 and a resilient element 350. The releasing element 340 is pivotally connected to connection unit 310 and is pressed against the pressing end 332 of the locking element 330. The resilient element 350 is mounted on the seat 200 and is pressed against the locking element 330. Owing to the resilient element 350, the locking element 330 always tends to be engaged in the locking hole 321. Under an applied force, the releasing element 340 drives the pressing end 332 to overcome the resilient force of the resilient element 350, thereby allowing the engaging end 331 to move and thus separate from the locking hole 321.

One end of the releasing element 340 forms a pivotal connection end 341. The pivotal connection end 341 has a pivotal connection hole. The pivotal connection hole enables the releasing element 340 to be pivotally connected to connection unit 310 and to press against the pressing end 332. The other end of the releasing element 340 protrudes from the connection unit 310 to form an operating end 342.

Under an applied force, the operating end 342 drives the releasing element 340 to pivot, thereby driving the locking element 330 to pivot.

Figure 4:
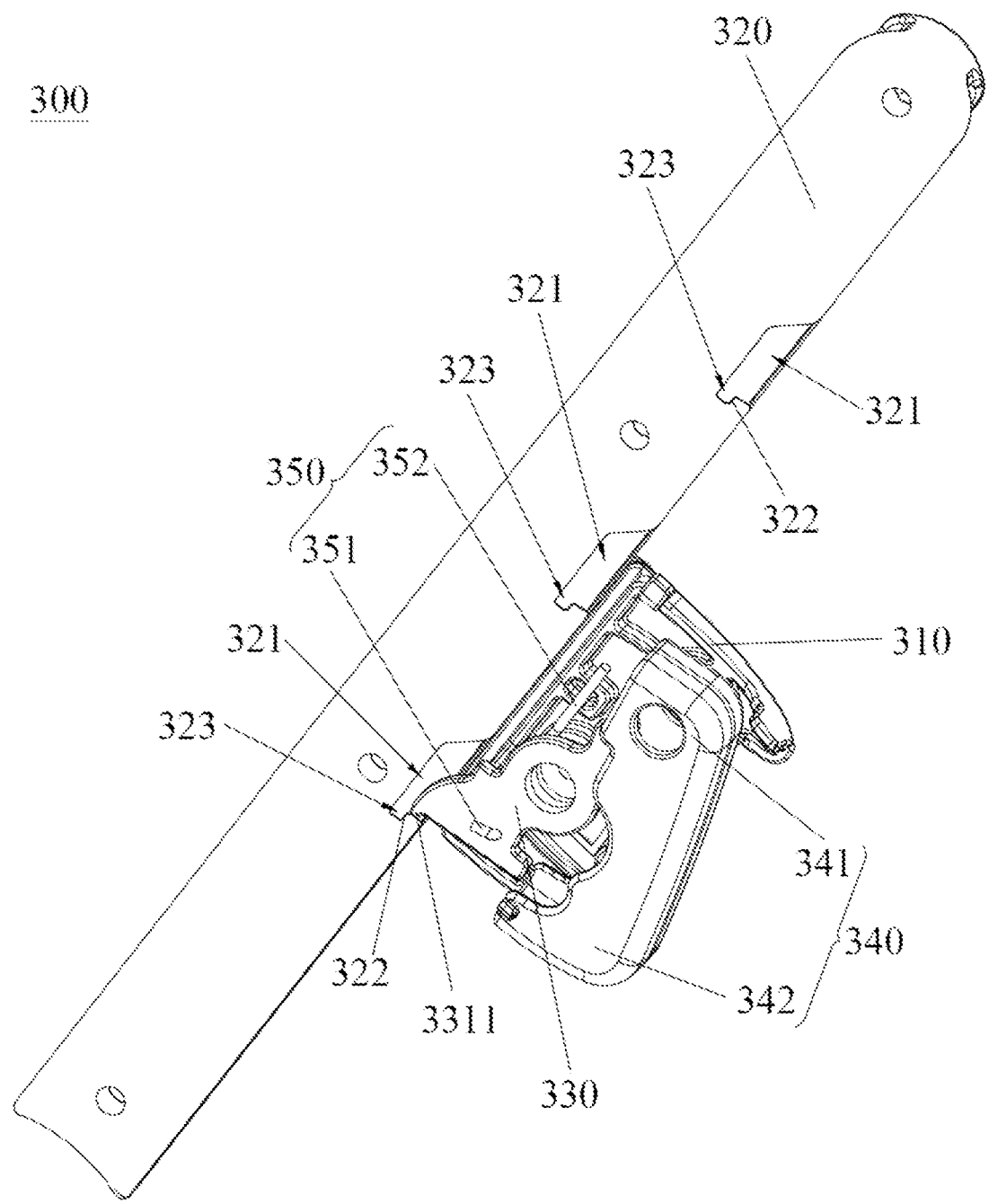
FIG. 4 is an exploded view of a seat height adjustment mechanism of the present disclosure.
Figure 5:
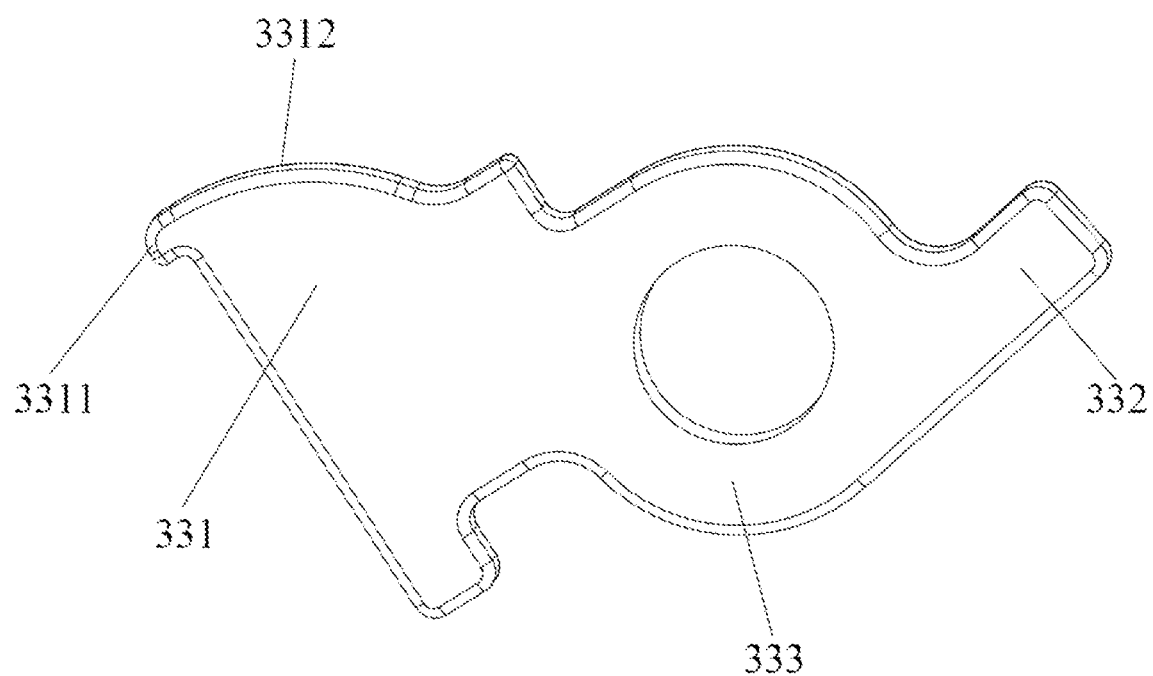
FIG. 5 is a schematic view of a locking element in FIG. 4.

Referring to FIG. 4 the, according to the present disclosure, the resilient element 350 is mounted on the connection unit 310 and comprises a first resilient arm 351 and a second resilient arm 352. The first resilient arm 351 connects to the engaging end 331. The second resilient arm 352 presses against the connection unit 310. Under the resilient force of the resilient element 350, the engaging end 331 always tends to be engaged in the locking hole 321. Preferably, the resilient element 350 is a torsion spring, but the present disclosure is not limited thereto, as the present disclosure may also use any other resilient elements.

Referring to FIGS. 1-8, the height adjustment process and principle of the seat 200 of stroller 1 of the present disclosure are described below.

To move the seat 200 from the low level shown in FIG. 1 to the high level shown in FIG. 2, pull the backrest pipe 230 of seat 200 upward in the direction indicated by arrow F1 shown in FIG. 1 to pull seat 200 upward along rail 110, such that sliding element 220 of seat 200 drives the connection unit 310 to slide upward along the rail 110. The upward sliding of the connection unit 310 causes the locking element 330 to slide from the first position shown in FIG. 6 to the second position shown in FIG. 7, such that the engaging hook 3311 separates from the stop portion 322, as shown in FIG. 7. Then, pull the backrest pipe 230 to cause the seat 200 to slide upward, driving the locking element 330 to keep sliding upward, such that the driving slope 3312 interacts with the end wall of the locking hole 321; thus, the driving slope 3312 causes the locking element 330 to pivot, such that the engaging end 331 separates from the locking hole 321 to release the locking element 330 from the locking bar 320, moving the seat 200 upward to the high level shown in FIG. 2. The process in which the locking element 330 rotates pivotally causes a compression and a deformation of the resilient element 350.

After the seat 200 has moved to the high level shown in FIG. 2, the locking element 330 rotates pivotally under the resilient force of the resilient element 350, such that the engaging end 331 is engaged in the corresponding locking hole 321 again. After the backrest pipe 230 has been released, the seat 200 slides downward with its' weight along the rail 110, such that the connection unit 310 and the locking element 330 therein slide downward. Thus, the locking element 330 slides to the first position, such that the engaging hook 3311 is engaged in the engaging slot 323, allowing the stop portion 322 to press against the engaging hook 3311, as shown in FIG. 6. Hence, even if the releasing element 340 is wrongly operated, the locking element 330 cannot be pivoted to cause separation of the engaging end 331 from the locking hole 321, thereby preventing the seat 200 from sliding downward after wrong operation.

In order for the seat 200 to move to the high level shown in FIG. 2 to the low level shown in FIG. 1, the releasing element 340 is operated to drive the locking element 330 for releasing from the locking bar 320, thereby allowing the seat 200 to slide downward along the rail 110. The seat 200 is pulled upward in the direction indicated by arrow F1 in FIG. 1, such that seat 200 again drives the connection unit 310 and the locking element 330 therein to slide upward, so as for the locking element 330 to slide again from the first position to the second position, thereby allowing the engaging hook 3311 to separate from the stop portion 322, as shown in FIG. 7. Then, the operating end 342 of releasing element 340 is pressed to pivot, such that the releasing element 340 pushes the pressing end 332 of the locking element 330 to enable pivotal rotation thereof, thereby allowing the engaging end 331 to separate from the locking hole 321 and thus achieving the release of the locking element 330, as shown in FIG. 8. The pivoting and releasing of the locking element 330 causes the compression and the deformation of the resilient element 350. After that, the seat 200 is pushed to slide downward along the rail 110. When the seat 200 moves to the low level shown in FIG. 1, the locking element 330 is engaged in the locking hole 321 again under the resilient force of the resilient element 350, whereas the seat 200 drives again the locking element 330 to slide to the first position and thus causes the engaging hook 3311 to spontaneously get engaged in the engaging slot 323. The stop portion 322 presses against the engaging hook 3311 to prevent the seat 200 from sliding downward as a result of wrong operation of the releasing element 340.

A stop portion 322 is protrudingly disposed in each of the locking hole 321 of the seat height adjustment mechanism 300 of the present disclosure. The locking element 330 of the seat height adjustment mechanism 300 of the present disclosure has an engaging end 331 separably engaged in any one of the locking holes 321. The engaging end 331 protrudingly forms an engaging hook 3311. The protrusion direction of the engaging hook 3311 crosses the direction in which the engaging end 331 moves and separates from the locking hole 321. The engaging hook 3311 separably presses against the stop portion 322. Thus, after the engaging end 331 has been engaged in the locking hole 321, the stop portion 322 presses against the engaging hook 3311 to prevent the separation of the engaging end 331 from the locking hole 321. Even if the locking element 330 is wrongly operated, it cannot be pivoted and unlocked. Therefore, the seat 200 is unlikely to slide downward along the stroller frame 100 spontaneously as a result of wrong operation of the locking element 330, ensuring the safety and stability of connection of the seat 200, and further ensuring the safety of any baby sitting in the seat 200.

Accordingly, the stroller 1 with the seat height adjustment mechanism 300 also has the aforesaid technical effects.

While the present disclosure has been described by means of specific embodiments, numerous modifications and variations could be made thereto by those skilled in the art without departing from the scope and spirit of the present disclosure set forth in the claims.

What is claimed is:

1. A seat height adjustment mechanism for adjusting a height of a seat on a stroller frame, comprising:
a locking bar disposed in the stroller frame and having locking holes, each of the locking holes having a stop portion protruding therein;
a locking element mounted on the seat and having an engaging end, the engaging end being separably engaged in any one of the locking holes, wherein an engaging hook of the engaging end presses against the stop portion; and
a releasing element pivotally connected to the seat, pressed against the locking element, and driving the locking element to move and separate from the locking hole upon a separation of the engaging hook and the stop portion.

2. The seat height adjustment mechanism of claim 1, further comprising a resilient element mounted on the seat and pressed against the locking element.

3. The seat height adjustment mechanism of claim 2, further comprising a connection unit mounted on the seat and slidingly connected to the stroller frame, wherein the locking element and the releasing element are pivotally connected to the connection unit to drive the connection unit to slide along the stroller frame and allow the locking element to be separably engaged in any one of the locking holes, thereby adjusting a height of the seat.

4. The seat height adjustment mechanism of claim 3, wherein the resilient element is mounted on the connection unit and comprises a first resilient arm and a second resilient arm, the first resilient arm connecting to the engaging end, the second resilient arm pressing against the connection unit.

5. The seat height adjustment mechanism of claim 3, wherein the releasing element has an end pivotally connected to the connection unit and pressing against the pressing end, and the releasing element has another end protruding from the connection unit to form an operating end.

6. The seat height adjustment mechanism of claim 1, wherein the engaging end has a first position and a second position in a height adjustment direction of the seat, the engaging end automatically moves to the first position to cause the engaging hook to press against the stop portion when the engaging end is engaged in the locking hole, and the engaging hook separates from the stop portion when the engaging end is moved to the second position, causing the engaging end to move and separate from the locking hole.

7. The seat height adjustment mechanism of claim 6, wherein a direction of switching from the first position to the second position is the direction of moving the seat from a low level to a high level.

8. The seat height adjustment mechanism of claim 6, wherein an engaging slot is formed between the stop portion and an inner wall of the locking hole, and the engaging hook is separably engaged in the engaging slot.

9. The seat height adjustment mechanism of claim 6, wherein the engaging end further has a driving slope, and the driving slope drives the engaging end to separate from the locking hole when under a force.

10. The seat height adjustment mechanism of claim 1, wherein the locking element further comprises a pressing end, wherein an included angle is defined between the pressing end and the direction which the engaging end is protruding, wherein the pressing end presses against the releasing element, such that the engaging end moves and separates from the locking hole.

11. The seat height adjustment mechanism of claim 10, wherein the locking element further comprises a pivotal portion pivotally connected to the connection unit, wherein the engaging end and the pressing end connect to the pivotal portion and respectively protrude in two directions.

12. The seat height adjustment mechanism of claim 1, wherein the engaging hook protruding in a direction, and the direction is crossed with another direction in which the engaging end moves when the engaging end is separating from the locking hole.

13. A stroller, comprising a stroller frame, a seat adjustably mounted on the stroller frame, and the seat height adjustment mechanism of claim 1.

14. The stroller of claim 13, wherein, after the locking element has been engaged in the locking hole, the locking element spontaneously presses against the stop portion.

15. The stroller of claim 14, wherein the engaging end further has a driving slope, wherein when applying a force, the seat moves toward the top of the stroller frame, such that the driving slope is subjected to the force to thereby drives the locking element to separate from the locking hole.

16. The stroller of claim 14, wherein when the seat moves toward a top of the stroller frame, the engaging hook is driven and separated from the stop portion and the locking element is also driven and separated from the locking hole.

17. The stroller of claim 13, wherein the stroller frame comprises a rail which the locking bar is disposed in, and the seat height adjustment mechanism further comprises a connection unit slidingly connected to the rail and connected to the seat, and the locking element is pivotally connected to the connection unit, wherein when applying a force, the seat slides to thereby drive the connection unit sliding along the rail and cause the locking element to be separably engaged in any one of the locking holes.

18. The stroller of claim 17, further comprising a sliding element slidingly connected to the rail and connected to the connection unit and the seat.

19. A seat height adjustment mechanism for adjusting a height of a seat on a stroller frame, comprising:
 a locking bar disposed in the stroller frame and having locking holes, each of the locking holes having a stop portion protruding therein; and
 a locking element mounted on the seat and having an engaging end, the engaging end being separably engaged in any one of the locking holes, wherein an engaging hook of the engaging end presses against the stop portion,
 wherein the engaging end has a first position and a second position in a height adjustment direction of the seat, the engaging end automatically moves to the first position to cause the engaging hook to press against the stop portion when the engaging end is engaged in the locking hole, and the engaging hook separates from the stop portion when the engaging end is moved to the second position, causing the engaging end to move and separate from the locking hole.

20. The eat height adjustment mechanism of claim 19, wherein the engaging end further has a driving slope, and the driving slope drives the engaging end to separate from the locking hole when under a force.

21. A stroller, comprising:
 a stroller frame;
 a seat adjustably mounted on the stroller frame; and
 a seat height adjustment mechanism for adjusting a height of the seat on the stroller frame, including:
  a locking bar disposed in the stroller frame and having locking holes; and
  a locking element mounted on the seat and having an engaging end, the engaging end being separably engaged in any one of the locking holes,
 wherein the engaging end further has a driving slope, wherein when applying a force, the seat moves toward the top of the stroller frame, such that the driving slope is subjected to the force to thereby drives the locking element to separate from the locking hole.

* * * * *